United States Patent
Amor et al.

(10) Patent No.: US 6,546,382 B1
(45) Date of Patent: Apr. 8, 2003

(54) FINDING THE TOP N VALUES THROUGH THE EXECUTION OF A QUERY

(75) Inventors: Angela Amor, Redwood City, CA (US); Cetin Ozbutun, San Carlos, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/433,827

(22) Filed: Nov. 3, 1999

(51) Int. Cl.[7] ............................................. G06F 17/30
(52) U.S. Cl. ................................... 707/2; 707/3; 707/4
(58) Field of Search .................................. 707/2–5, 7

(56) References Cited

U.S. PATENT DOCUMENTS

| | | | |
|---|---|---|---|
| 5,897,632 A | 4/1999 | Dar et al. ....................... | 707/2 |
| 5,956,706 A | * 9/1999 | Carey et al. .................... | 707/2 |
| 6,125,360 A | 9/2000 | Witkowski et al. ............. | 707/2 |
| 6,134,543 A | 10/2000 | Witkowski et al. ............. | 707/2 |
| 6,199,063 B1 | 3/2001 | Colby et al. .................... | 707/4 |

OTHER PUBLICATIONS

Carey M et al., "Reducing the Braking Distance of an SQL Query Engine", Proceedings of 24th International Conference on Very Large Databases, Aug. 24–27, 1998, pp. 158–169.*

Chaudhuri et al., "Evaluating Top k Selection Queries", Proceedings of 25th International Conference on Very Large Databases, Sep. 7–10, 1999, pp. 399–410.*

Carey et al. "On Saying Enough already!" in SQL, Proceeding of the ACM SIGMOD International conference on Management of data, 1997, pp. 219–230.*

Koch et al "Oracle 8, the Complete Reference" Osborne/McGraw–Hill, 1997, pp. 415, 919–920.*

Chaudhuri, Surajit et al., "Optimizing Queries with Materialized Views", Proceedings of the Eleventh International Conference on Data Engineering, Mar. 6–10, 1995, pp. 190–200.

Gopalkrishnan Vivekanand et al., "Issues of Object–Relational View in Data Warehousing Environment", 1998 IEEE International Conference on Systems, Man, and Cybernetics, Oct. 11–14, 1998, vol. 3, pp. 2732–2737.

Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.

Segev, Arie et al., "Maintaining Materialized Views in Distributed Databases", Proceedings of the Fifth International Conference on Data Engineering, Feb. 6–10, 1989, pp. 262–270.

* cited by examiner

*Primary Examiner*—Jean R. Homere
*Assistant Examiner*—Khanh Pham
(74) *Attorney, Agent, or Firm*—Marcel K. Bingham; Hickman Palermo Truong & Becker LLP

(57) ABSTRACT

A method and mechanism is provided for executing a query that includes a subquery, where the subquery includes an ORDER BY clause. The results generated by executing the subquery are ordered as specified by the ORDER BY clause. When the results of the subquery are referenced by the outer query, the results generated for the subquery satisfy the restriction. For example, the restriction may specify that the row number pseudo-column be less than a threshold. In response, a TOP N operation is performed to return the rows that are TOP N in order. The order is based on the ORDER BY clause.

15 Claims, 2 Drawing Sheets

FINDING THE TOP N VALUES THROUGH THE EXECUTION OF A QUERY

FIELD OF THE INVENTION

The present invention relates to executing queries, and in particular, executing queries to generate the TOP N in order values from a set of data.

BACKGROUND OF THE INVENTION

Users of database systems retrieve data through the use of queries. A query is a request for data. Typically, queries must conform to the rules of a particular query language, such as the ANSI Structured Query Language (SQL). For example, query B1:

SELECT salary FROM payroll WHERE salary>10000 retrieves values from the salary column of those rows of table payroll whose value in salary is greater than 10000. The above query includes a SELECT clause (i.e. "SELECT salary"), a FROM clause (i.e. "FROM payroll"), and a WHERE clause (i.e. "salary>10000"). The FROM clause specifies one or more tables or views from which to retrieve values. The tables or views identified in the FROM clause are referred to as the FROM list. The SELECT clause specifies one or more columns in the items in the FROM list from which to retrieve values. The one or more columns identified in the SELECT clause are referred to as the SELECT list. The WHERE clause specifies the rows from which the values are to be retrieved. Specifically, the WHERE clause contains one or more logical expressions defining criteria that must be met by the rows from which values are retrieved.

When a database system executes an SQL query, the database system returns results in the form of a set of rows. Each row contains the columns specified in the SELECT list of the query. Users often desire that the data requested by a query be returned in a particular order. A user may specify an order by including an ORDER BY clause in a query. For example, query B2 follows:

SELECT salary FROM payroll ORDER BY salary DESC
The ORDER BY clause in query B2 references salary. The columns referenced by an ORDER BY clause are referred to as sort columns. The values in the sort columns are referred to as sort values. Query B1 specifies that the rows returned by query B1 are to be returned in a descending order based on the sort values in sort column salary. The keyword DESC specifies the order to be descending.

Rows may be returned in ascending or descending order. The default is ascending. The return order may be specified using the keyword ASC for ascending or DESC for descending.

A user that requests ordered data may desire only the TOP N rows in order. The term "TOP N" refers to the first N data items in an ordered set of data items. For example, the first 10 rows from payroll in ascending order based on salary. An operation or process that returns the TOP N data items based on an order is referred to as a TOP N operation.

To retrieve the top 10 salary values stored in the salary column of the payroll table, a user process issues a query to the database system that contains payroll. To the get rows with the top 10 salary values, the user issues the query B2 to the database system. The database system returns to the user all the rows from payroll in an order according to the values in salary. The user then retains the first 10 rows received, and discards the rest.

To generate the results, data from all the rows in payroll may have to be scanned, stored, and sorted. Thus, the work to store and sort all the rows is wasted because only a subset of rows are needed by the user. Based on the foregoing, it is clearly desirable to provide a mechanism for retrieving the TOP N rows in an order without wasting work to store and sort all the rows in a table.

SUMMARY OF THE INVENTION

A method and mechanism is described for executing a query that includes a subquery, where the subquery includes an ORDER BY clause. The result set generated by executing the subquery is ordered as specified by the ORDER BY clause. When the result set of the subquery is referenced by a restriction in the outer query, each row in the result set generated for the subquery satisfies the restriction. For example, the restriction may limit the result set generated for a subquery to rows that have values for the row number pseudo-column that are less than a threshold. In response, a TOP N operation is performed to return the rows that are TOP N in order. The order is based on the ORDER BY clause.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for performing a TOP N operation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Exemplary Query and Subquery

According to an embodiment of the present invention, a TOP N operation is performed through the use of a subquery that includes an ORDER BY clause and a restriction that references the result set of the subquery. The following query EX is provided as an example.

SELECT salary FROM (SELECT salary FROM payroll ORDER BY salary) WHERE rownum<10

The query EX contains the subquery $EX_S$, i.e. (SELECT salary FROM payroll ORDER BY salary). A subquery is a query within a query. The FROM list of query EX includes subquery $EX_S$. The SELECT list of query EX references columns of the result set generated for subquery $EX_S$, which include the column salary listed in the SELECT list of subquery $EX_S$. The query that references the columns of the result set of a subquery in the query's FROM list is referred to as an outer query.

The rows in the result set generated for subquery $EX_S$ will each be associated with a row number pseudo-column, referred to herein as a "rownum". The row number pseudo-column of a row is a unique value from an ordered set of values. An ordered set of values, may be, for example, a set of integers. The first row in the result set of the subquery will have the rownum value first in order, and the second row will have the rownum value second in order, and so forth. The restriction "rownum<10" restricts the rows that are in the result set of query EX to the first 10 rows of the result set of subquery $EX_S$. A subquery, that includes an ORDER BY clause, and whose outer query references the rownum pseudo-column of the result set of the subquery, is referred to as a Row Restricted Orderby Subquery.

Because the subquery EX contains an ORDER BY clause, to generate the result set for subquery EX, data from all the rows in payroll may be scanned, stored, and sorted. The TOP 10 rows for subquery EX are selected from the results and returned to the entity issuing query EX. The rows not returned are discarded. Thus work is still performed to store and sort all the rows even though only a subset of rows are returned.

Optimized TOP N Operation

Figure 1:
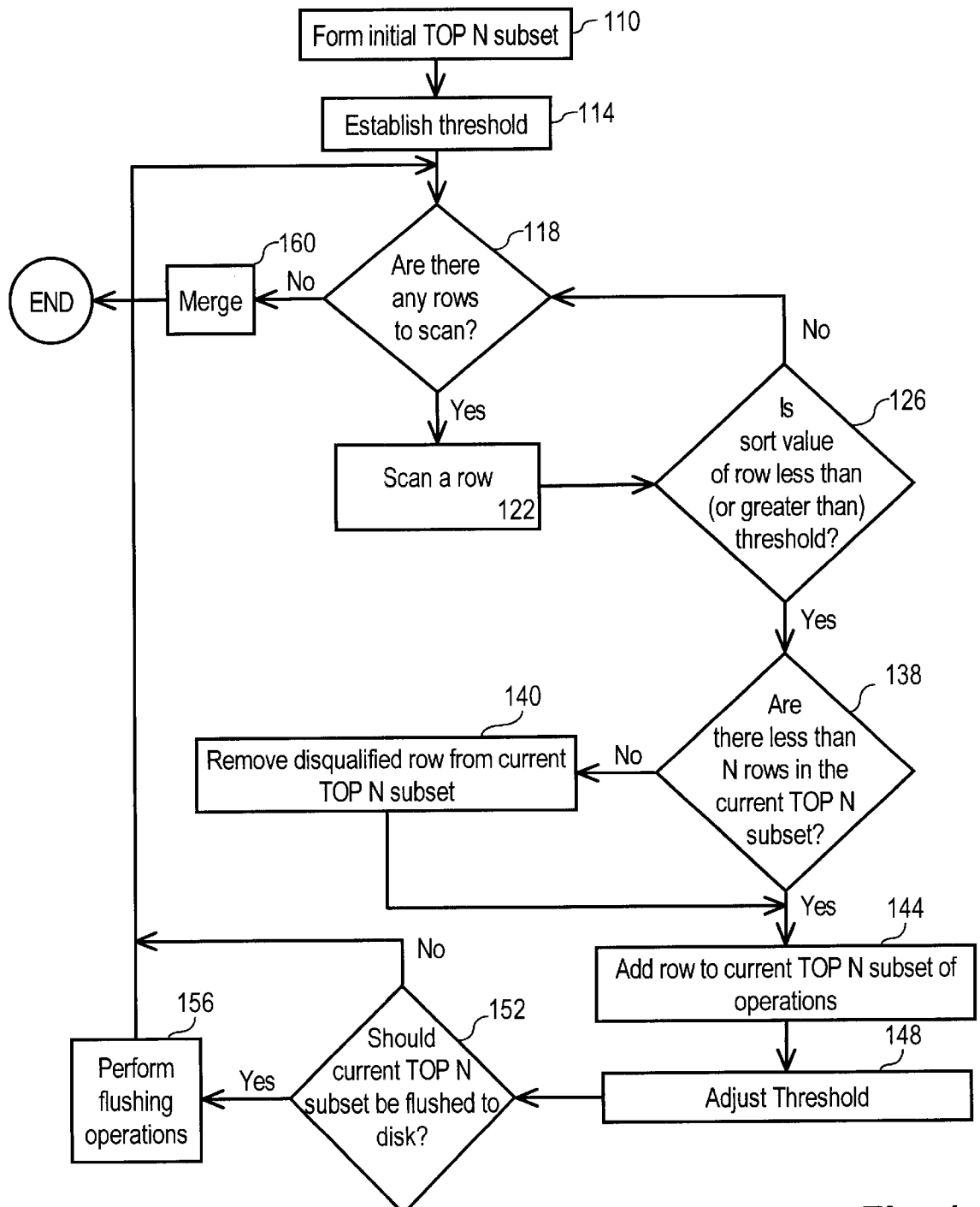
FIG. 1 is a flow chart depicting a process for selecting the rows that are TOP N in an order.

FIG. 1 shows a process that may be used to more efficiently perform a TOP N operation. The process is performed when a database system detects a Row Restricted Orderby Subquery and scans data from the table that contains the table referenced by the ORDER BY clause. The process is based on the formation of one or more TOP N subsets. A TOP N subset is a subset of rows that the process determines cannot be excluded from the TOP N rows in the order requested by a query. That is, a TOP N subset contains rows that are candidates for the TOP N rows in order. The process scans rows and discards any rows that do not belong to a TOP N subset (i.e., that cannot possibly be TOP N rows). The process of FIG. 1 is illustrated using query EX.

Referring to FIG. 1, at step 110, the initial TOP N set is formed. The initial TOP N set includes the first N rows scanned. The initial N rows scanned are in the TOP N subset because, at least initially, they may all be TOP N rows. In this example, the first 10 rows scanned are from the payroll table, and thus the initial TOP N subset is formed. The rows are stored in one or more volatile memory buffers. A variety of data structures may be used to store the list, including arrays, link lists and binary trees.

Figure 2:
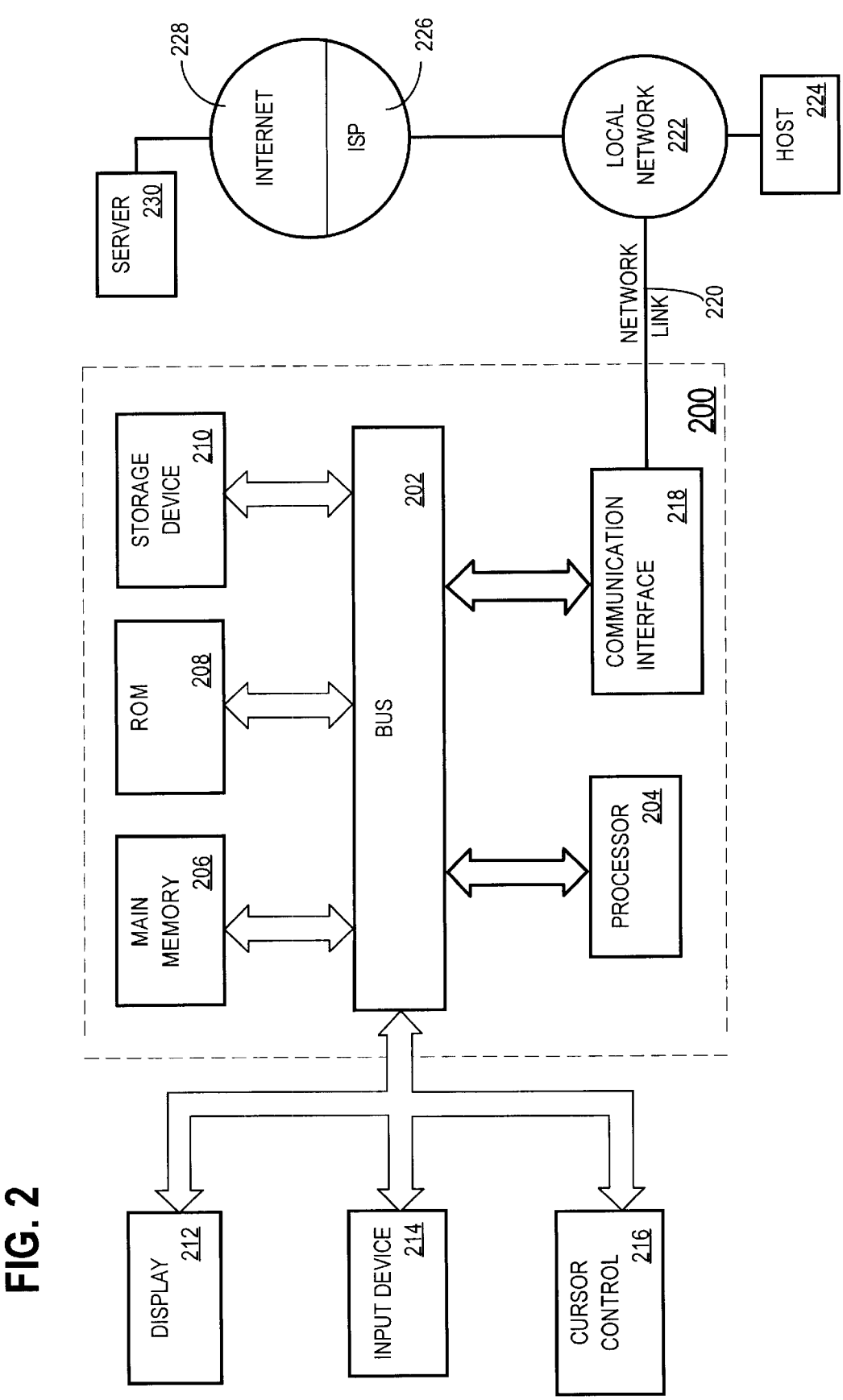
FIG. 2 is a block diagram depicting a computer upon which an embodiment of the present invention may be implemented.

As the process in FIG. 2 is executed, more than one TOP N subset may be formed. Multiple TOP N subsets are formed for purposes of memory management, as shall be described in greater detail. One of the TOP N subsets is stored in one or more buffers ("memory buffers") in volatile memory. This TOP N subset is referred to as the current TOP N subset. Initially, the initial TOP N subset is the current TOP N subset.

At step 114, the entry threshold is established. The entry threshold is used to determine whether a scanned row belongs to the current TOP N subset. The entry threshold is compared to the sort value of each row as the row is scanned. How the threshold is established and used is based on whether the result set to be returned for the subquery should be in ascending or descending order. If the subquery returns the result set in descending order, then the threshold is the smallest sort value in the current TOP N subset. If the sort value of the scanned row is greater than the threshold, then the scanned row is added to the current TOP N subset. If the subquery returns the result set in ascending order, then the threshold is the largest sort value in the current TOP N subset. If the sort value of the scanned row is less than the threshold, then the scanned row is added to the current TOP N subset. For purposes of illustration, it shall be assumed that the rows are being sorted by descending order, and the smallest sort value of any row in the current TOP N subset is 50000.

At step 118, it is determined whether there are any more rows to scan from the table. If there are more rows to scan, then execution of the steps proceeds to step 122, where another row is scanned from the table.

At step 126, the sort value of the scanned row is compared with the threshold to determine whether the row belongs in the current TOP N subset. In this example, the scanned row has a sort value of 75000, which is greater than the threshold. Therefore, the row belongs to the TOP N subset.

At step 138, it is determined whether there are less than N rows in the current TOP N subset. As shall be explained hereafter, it is possible for the current TOP N subset to contain less than N rows if a flushing operation (step 156) has recently taken place. If there are less than N rows, then at step 144 the scanned row is added to the current TOP N subset. If there are at least N rows in the TOP N subset, then one of the rows in the current TOP N subset cannot be TOP N in order. At step 140, the row in the current TOP N subset that should not be in the TOP N subset is removed. In the current illustration, there are N rows in the TOP N subset. Therefore, at step 140, the row with the lowest sort value is removed from the TOP N subset. At step 144, the current scanned row is added to the TOP N subset.

Adding a new member to and removing a new member from the current TOP N subset may change the threshold used to determine whether a particular scanned row qualifies for the TOP N subset. For example, in the current illustration, the member of the TOP N subset that was removed had a sort value of 50000, the value upon which the current threshold was based. After removing that row from the TOP N set and adding the current row, the lowest sort value of any member of the current TOP N subset is 60000. At step 148, the entry threshold is recalculated to the lowest sort value of the rows that belong to the current TOP N subset. In the current illustration, the entry threshold is adjusted to 60000.

Adding a row to the TOP N subset may increase memory needed to store the TOP N subset, depending on how memory is managed. For example, under some memory management schemes, when a row is removed from the TOP N subset, the memory it occupied is not automatically de-allocated or used to store another row. Thus, even though rows are removed from the TOP N subset when a row is added, the amount memory occupied in the memory buffers continues to grow.

At step 152, the process determines whether the current TOP N subset should be flushed from the buffers to disk to make the buffers available for adding additional rows to the current TOP N subset.

At step 156, "flushing operations" are performed. Flushing operations refer to operations for transferring data from memory buffers to disk for later retrieval, thereby making the memory buffers available to store new rows. In particular, the TOP N subset is transferred to disk, and memory buffers become available to form a new current TOP N subset.

Once flushing operations are performed, another row is scanned at step 122. At step 126, the sort value is compared with the entry threshold. Note that the threshold value that existed before a flushing operation remains. Consequently, no row is added to the new current TOP N subset unless it qualifies for entry into the TOP N subset that was previously in memory. For example, the entry threshold is 60000 when a TOP N subset is transferred to disk. After transferring the TOP N subset, the formation of a new current TOP N subset is begun. No row will be added to the new TOP N subset unless it has a sort value that is greater than 60000.

Eventually, at step 118, the process will determine that there are no rows to scan. Then at step 160, all the TOP N subsets that have been formed are merged into a final TOP N subset. The term merge refers to selecting the TOP N rows in order from all the formed TOP N subsets. The execution of the steps ends, and the result set is returned in TOP N order.

Even though all rows in a table are scanned, the database system filters rows based on the restriction on rownum while generating the result set of subquery $EX_S$, discarding rows that cannot qualify to be TOP N in order. Thus, resources are not expended to store and buffer rows that cannot be TOP N in order, and the sort is performed on a relatively small subset of the rows that otherwise satisfy the selection criteria.

Filtering based on a restriction referencing the result set of a subquery while generating the result set of the subquery not limited to TOP N operations. Therefore, it is understood that the present invention is not limited queries executed to perform TOP N operations.

Hardware Overview

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for executing a subquery contained in an outer query, the method comprising the steps of:
   determining that said outer query satisfies a set of one or more criteria, wherein said outer query includes a restriction that references the result set of the subquery, wherein said set of one or more criteria includes a criterion that said restriction reference the result set of said subquery; and
   in response to determining that said outer query satisfies a set of one or more criteria, filtering rows based on said restriction to generate the result set for said subquery.

2. The method of claim 1, wherein said restriction limits the result set of said outer query to rows that are top N in a particular sort order.

3. The method of claim 1, wherein:
   said subquery contains an ORDER BY clause; and
   said particular sort order is based on a sort order specified by said ORDER BY clause.

4. The method of claim 2, wherein:
   said result set is associated with a row number psuedo-column; and
   wherein said set of one or more criteria include a criterion that said restriction limits the result set of said outer query to rows associated with a row number pseudo-column value that is less than a threshold.

5. The method of claim 1, wherein the step of filtering rows based on said restriction to generate the result set includes:
   scanning a particular row from a set of one or more rows in a table referenced by said subquery;
   determining whether said particular row satisfies another set of one or more criteria for establishing a row as a candidate for the result set of the outer query; and
   if said particular row does not satisfy another set of one or more criteria, eliminating said row as a candidate for the result set of said outer query.

6. The method of claim 5, wherein the step of filtering rows based on said restriction to generate the result set includes:
   storing in volatile memory, as candidates for said result set of said outer query, a first plurality of rows that each meet said other set of one or more criteria;
   flushing said first plurality of rows to non-volatile memory;
   establishing a threshold based on sort values from said first plurality of rows;
   reading a second plurality of rows that each have a sort value;
   for each row of said second plurality of rows:
      determining whether said each row satisfies said other set of one or more criteria by comparing said threshold to said sort value of said each row; and
      storing in volatile memory, as a candidate for said result set of said outer query, said each row when said each row satisfies said other set of one or more criteria.

7. A computer-readable medium carrying one or more sequences of one or more instructions for executing a subquery contained in an outer query, the one or more sequences of one or more instructions including instructions which, when executed by one or more processors, cause the one or more processors to perform the steps of:
   determining that said outer query satisfies a set of one or more criteria, wherein said outer query includes a restriction that references the result set of the subquery, wherein said set of one or more criteria includes a criterion that said restriction reference the result set of said subquery; and
   in response to determining that said outer query satisfies a set of one or more criteria, filtering rows based on said restriction to generate the result set for said subquery.

8. The computer-readable medium of claim 7, wherein said restriction limits the result set of said outer query to rows that are top N in a particular sort order.

9. The computer-readable medium of claim 8, wherein:
   said subquery contains an ORDER BY clause; and
   said particular sort order is based on a sort order specified by said ORDER BY clause.

10. The computer-readable medium of claim 8, wherein:
    said result set is associated with a row number psuedo-column; and
    wherein said set of one or more criteria include a criterion that said restriction limits the result set of said outer query to rows associated with a row number pseudo-column value that is less than a threshold.

11. The computer-readable medium of claim 7, wherein the step of filtering rows based on said restriction to generate the result set includes:
    scanning a particular row from a set of one or more rows in a table referenced by said subquery;
    determining whether said particular row satisfies another set of one or more criteria for establishing a row as a candidate for the result set of the outer query; and
    if said particular row does not satisfy another set of one or more criteria, eliminating said row as a candidate for the result set of said outer query.

12. The computer-readable medium of claim 11, wherein the step of filtering rows based on said restriction to generate the result set includes:

storing in volatile memory, as candidates for said result set of said outer query, a first plurality of rows that each meet said other set of one or more criteria;

flushing said first plurality of rows to non-volatile memory;

establishing a threshold based on sort values from said first plurality of rows;

reading a second plurality of rows that each have a sort value;

for each row of said second plurality of rows:
  determining whether said each row satisfies said other set of one or more criteria by comparing said threshold to said sort value of said each row; and
  storing in volatile memory, as a candidate for said result set of said outer query, said each row when said each row satisfies said other set of one or more criteria.

13. A database system, configured to execute a subquery contained in an outer query by:

determining that said outer query satisfies a set of one or more criteria, wherein said outer query includes a restriction that references the result set of the subquery, wherein said set of one or more criteria includes a criterion that said restriction reference the result set of said subquery; and responding to determining that said outer query satisfies a set of one or more criteria, by filtering rows based on said restriction to generate the result set for said subquery.

14. The database system of claim 13, wherein said restriction limits the result set of said outer query to rows that are top N in a particular sort order.

15. The database system of claim 14, wherein:

said result set includes rows that each contain a value for a row number pseudo-column;

wherein said set of one or more criteria include
  a criterion that said restriction limits the result set of said outer query to rows with a row number pseudo-column value that is less than a threshold; and
  a criterion that said subquery includes an ORDER BY clause that specifies a particular sort order based on said row number pseudo-column.

* * * * *